Patented May 9, 1950

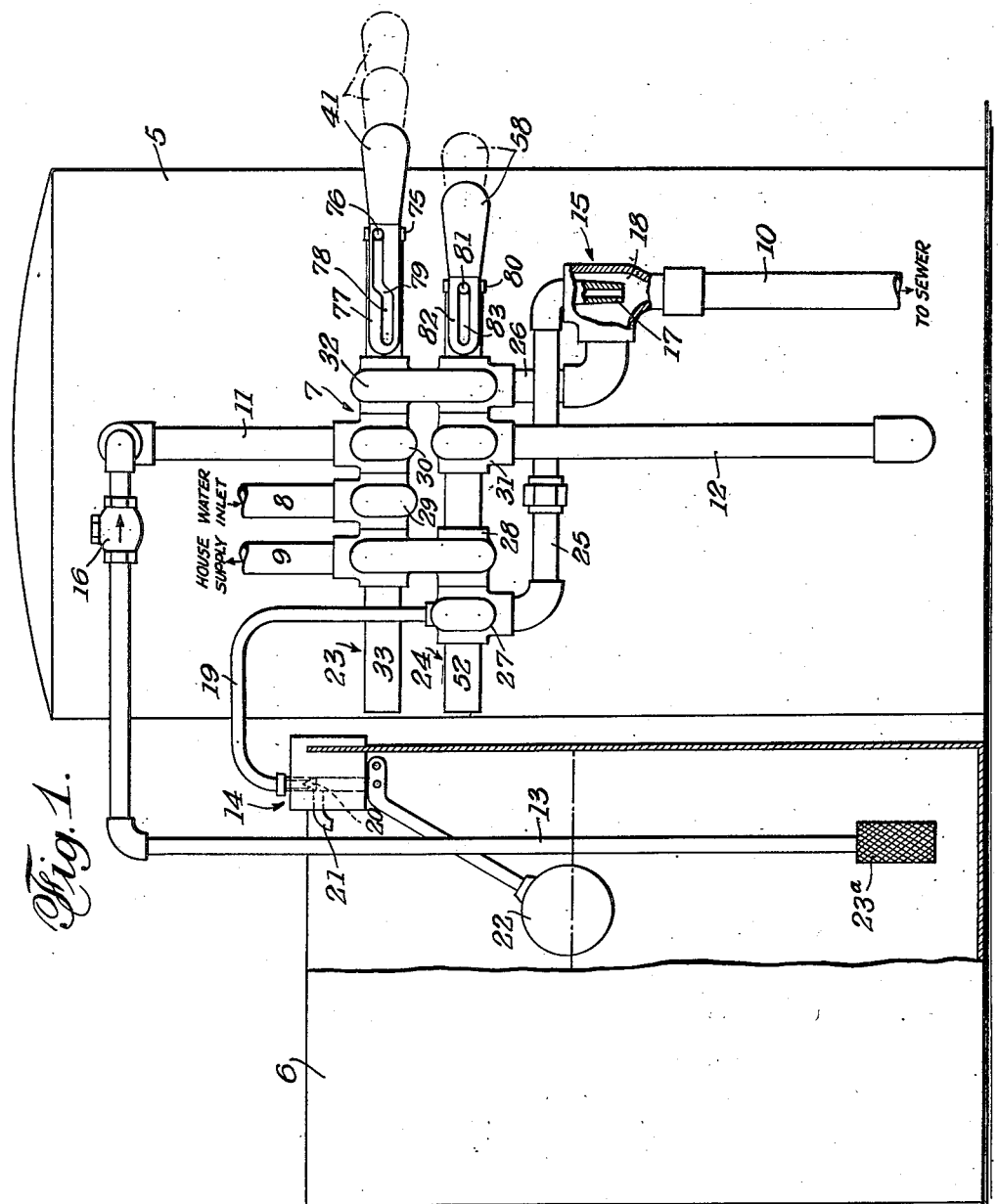

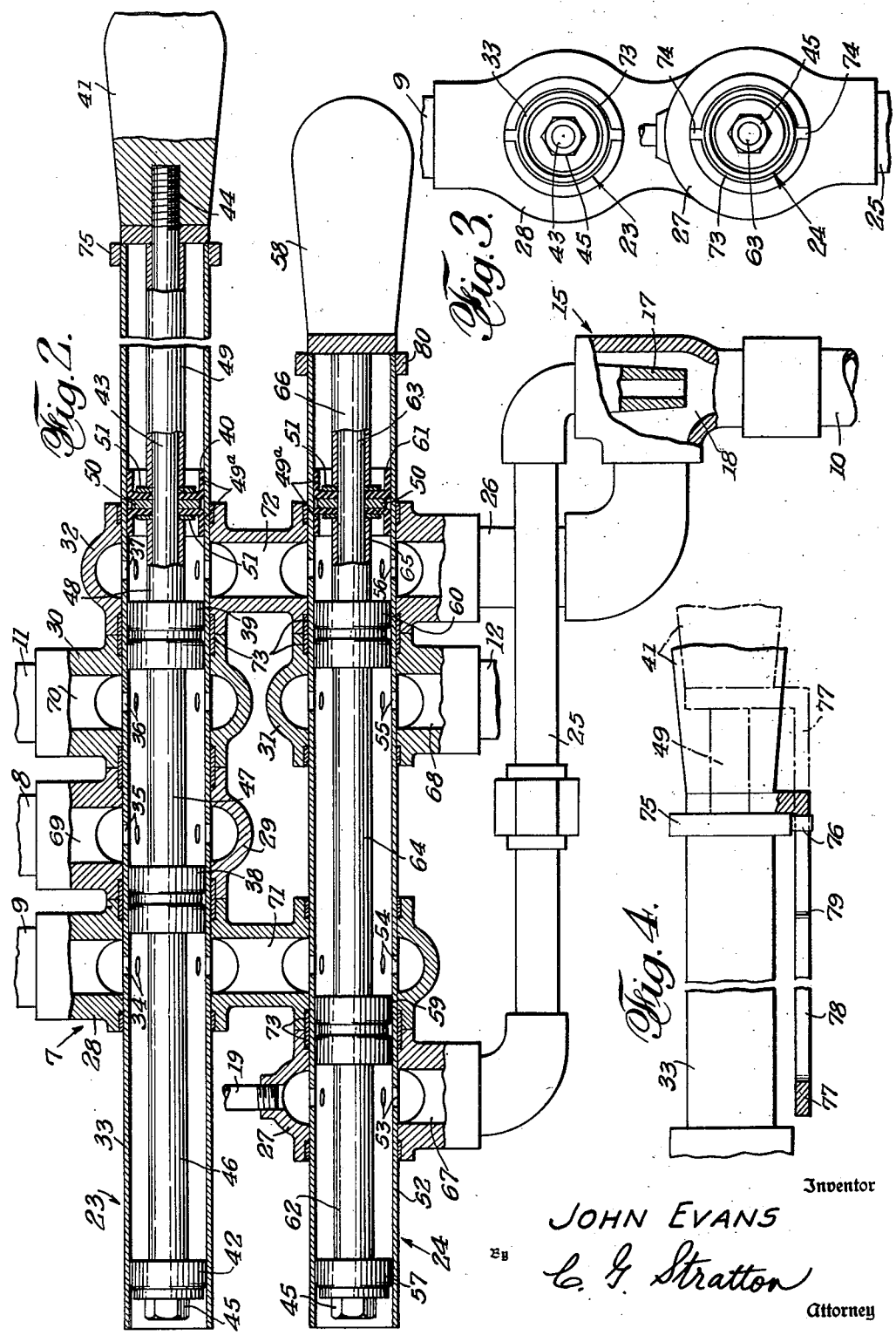

2,506,711

UNITED STATES PATENT OFFICE 2,506,711

APPARATUS FOR REGENERATING A WATER SOFTENER

John Evans, Salt Lake City, Utah, assignor to Mountain Valve Company, Inc., Salt Lake City, Utah, a corporation of Utah Original application April 25, 1946, Serial No. 664,820. Divided and this application September 22, 1947, Serial No. 775,416

3 Claims. (Cl. 210—24)

The present invention relates to water softening apparatus and deals more particularly with a valving system whereby normal operation of the apparatus is maintained and whereby regeneration of a mineral bearing water softening agent is easily, efficiently and quickly effected.

The primary object of the invention is to provide a novel and improved unitary valve structure whereby the water supply is maintained during the process of regenerating the water softening agent employed for normally softening said water supply.

Another object of the invention is to provide a valving system of the character indicated for first back-washing through the water softening agent, then passing salt water or brine downwardly through said agent, and finally washing out the salt from the agent to effect regeneration thereof, all being accomplished while a water supply to the house served by the apparatus, is being maintained.

Another object of the invention is to provide a compact and unitary valve structure embodying novel piston controlled porting means to effect the mentioned water softener regeneration in a rapid and efficient manner.

A further object of the invention is to provide an apparatus for regenerating a water softening agent embodying novel means for handling the salt or brine used in the system and for automatically controlling the level of brine in the supply tank.

A further object of the invention is to provide a valve of the character indicated, which embodies novel structural features tending toward simplification, efficacy of construction and operation, and general compactness and low cost of manufacture.

A still further object of the invention is to provide an improved method for effecting regeneration of water softening material while the normal supply of water is uninterruptedly maintained, the generation steps, successively, comprising cleansing of the water softening material, passing brine therethrough, and washing out any residual salt.

My invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description. However, the drawings merely show and the following description merely describes one embodiment of the present invention, which is given by way of illustration or example only.

In the drawings, like reference characters designate similar parts in the several views.

Fig. 1 is an elevational view, partly in vertical section, of a water softening apparatus according to this invention.

Fig. 2 is an enlarged longitudinal sectional view of a control valve for said apparatus.

Fig. 3 is an end view as seen from the left of Fig. 2.

Fig. 4 is a broken plan sectional view of a handle and means controlling the movement of said handle as used in the valve of Fig. 2.

This application is a division of my pending application entitled Water softening apparatus, Serial No. 664,820, and filed April 25, 1946.

The apparatus which is illustrated comprises, generally, a pressure tank 5 filled with a water softening agent or mineral; another tank 6 containing salt to produce salt water or brine; a unitary valve construction 7 having a water inlet 8, a house supply 9, a drain or sewer connection 10, and connections 11 and 12 to the upper and lower portions, respectively, of the tank 5; a brine supply line 13 from the tank 6 to the tank 5; and a float controlled valve connection 14 from the valve 7 to the tank 6.

The valve 7, as will be later described, is designed according to the invention, to provide for a flow from the water inlet 8 through the house supply 9 under all conditions of operation of the valve 7. In normal operation, water from the inlet 8 is directed, by the valve 7 through connection 11 to the top of tank 5 so that the water is circulated downward through the water softener in said tank to flow upward in connection 12 to valve 7 and finally out through the supply line 9.

When regeneration of the mineral in tank 5 is desired, the valve 7 is manually operated to backwash upward through said tank 5 by directing the water from the inlet 8 downwardly through connection 12 to flow upwardly through the mineral in tank 5, then downwardly in connection 11 through valve 7 and out through the sewer or drain line 10. This flow will wash away sediment accumulation on the surface of the mineral in tank 5. The valve 7 is then operated to direct water from the inlet 8 through the valve and through a vacuum inducing jet 15 to the sewer line 10. This flow will cause an upward flow in connection 12, creating a suction or vacuum in line 13 and connection 11 so that brine from tank 6 will flow past check valve 16 to be circulated downward through the mineral in tank 5. The valve 7 is then operated to close the brine supply and downwardly wash the salt out of the mineral in tank 5. The water flow will now be from inlet 8, through connection 11, downwardly through tank 5, up through connection 12 and out through sewer line 10. During the two latter positions of the valve, a fresh supply of water is provided for tank 6 through connection 14 to replace brine drawn from said tank. In practice, the sediment washing operation takes about five minutes, the brine circulating operation about ten minutes, and the washing out of the brine or salt takes approximately twenty to thirty minutes. By restoring the valve 7 to its initial position, the apparatus will function to soften water passing from the inlet 8 to the supply 9.

The check valve 16 prevents back-flow through line 13 and remains closed at all times except when flow of brine into tank 5 is desired. The jet 15 is a simple device having a central nozzle 17, downward flow through which induces a downward flow of liquid in the chamber 18 around the nozzle. The means 14 comprises a line 19 from the valve 7, a needle valve 20 in said line controlling an outlet 21 to tank 6, and a float 22 controlling said needle valve 20 when the level of said tank is reached. A screened strainer 23a may be provided in the line 13.

The valve 17 comprises, generally, a pair of valving units 23 and 24 adapted to be manually positioned to control flow through the various lines or pipes 8, 9, 11 and 12, through a line 25 from the valve to the jet nozzle 17, and through a line 26 from the valve to the jet chamber 18. Said units 23 and 24 are arranged to control flow through castings or fittings 27, 28, 29, 30, 31 and 32 connected to the above lines. The castings 27, 29, 30 and 31 are generally similar and each is controlled by one or the other of the units 23 or 24. The castings 28 and 32 are similar and are each controlled by both said units.

The valving unit 23 comprises an elongated tube 33 in which is provided radial spaced sets of ports 34, 35, 36 and 37. Within said tube there is provided longitudinal spaced pistons 38, 39 and 40, the piston 38 being normally located between ports 34 and 35, the piston 39 between ports 36 and 37, and the piston 40 between ports 37 and a handle 41. A fourth piston 42 is provided on the other side of ports 34.

The pistons are connected to be moved as a unit with respect to the ports in tube 33. As shown, an axial rod 43 passes through the centers of the pistons, is threaded at one end at 44 into the handle 41 and provided with a nut 45 on its opposite end. A spacing tube 46 is arranged over the rod 43 between pistons 42 and 38, a tube 47 spaces pistons 38 and 39, a similar tube 48 spaces pistons 39 and 40, and a similar tube 49 spaces piston 40 and handle 41. It will be evident that by moving the handle longitudinally, the pistons can be moved for desired position with respect to the ports in tube 33.

As shown, each piston 38, 39 and 40 comprises oppositely directed, preferably rubber or composition cups 49a spaced by a washer 50 and held in place by the ends of the respective spacing tubes 46, 47, 48 and 49. To seal around the rod 43, a rubber or composition thrust washer 51 is interposed between said cups 49 and the tube ends bearing thereon.

The valving unit 24 is somewhat similarly formed, including a tube 52 having longitudinally spaced radial sets of ports 53, 54, 55 and 56, a piston 57 at one end similar to piston 42, a handle 58 at the other end, a piston 59 normally between ports 53 and 54, a piston 60 between ports 55 and 56, and a piston 61 between ports 56 and the handle 58. A spacing tube 62 on a rod 63, similar to rod 43, spaces pistons 57 and 59, a tube 64 spaces pistons 59 and 60, a tube 65 spaces pistons 60 and 61, and a tube 66 spaces piston 61 and handle 58. In other respects the valving units 23 and 24 are similar.

The casting 27 is mounted on tube 52 and is provided with a passage 67 in communication with ports 53. Similarly, casting 31 is mounted on said tube to have its passage 68 in communication with ports 55. Castings 29 and 30 are mounted side-by-side on tube 33 to have their respective passages 69 and 70 in communication with the respective ports 35 and 36. The casting 28 is mounted across both tubes 33 and 52 so that its passage 71 communicates with both sets of ports 34 and 54. Similarly, casting 32 has a passage 72 communicating with ports 37 and 56.

The castings 27 to 32 are fixed to the tubes 33 and 52. An effective manner of accomplishing this is to provide end counterbores 73 in each casting, to heat said castings, and pour solder into the counterbores to firmly fix the casting in place and seal against water leakage around the tubes 33 and 52. By drilling as 74 through adjacent casting, solder may be readily poured into the counterbores.

From the above it will be seen that longitudinal movement of the pistons in the ported tubes 33 and 52 by endwise push or pull on handles 41 and 58, will provide liquid circulation as hereinbefore set forth. The pistons in tube 33 have three positions with relation to the ports in said tube; one as shown; a second with the piston 38 between ports 35 and 36; and a third, with said piston between ports 36 and 37. The pistons in tube 52 have two positions; one as shown, and the other with piston 59 between ports 54 and 55.

Means are provided for guiding the manual positioning of said pistons. For the valving unit 23, said means comprises a collar 75 on the end of the tube 33 adjacent the handle 41, a radial pin 76 on said collar, a longitudinal plate 77 carried by the handle, and a slot 78 for the pin and which is formed with an offset to have an intermediate abutment 79. For the valving unit 24, said means comprises a collar 80, a pin 81 on the collar, a plate 82 carried by the handle, and a slot 83 for the pin 81.

In normal operation the valve 7 is set as shown. The water flow is through inlet 8, passage 69, ports 35, tube 33, ports 36, passage 70, and connection 11 into top of tank 5. The water will pass downwardly through said tank to have its calcium and other hardening matter removed, and then will pass upwardly in connection 12, passage 68, ports 55, tube 52, ports 54, passage 71, ports 34, and house supply line 9. The pressure in connection 11 is effective to hold check valve 16 closed during the normal operation. In this position of the valve, the piston 59 serves to check flow of water in line 19 during the long periods of time regeneration operations.

When the mineral in tank 5 has become excessively coated with sediment, the regeneration process is started by pulling on handle 41 until the slot abutment 79 engages the pin 76. The water flow will now be from inlet 8, through ports 35, tube 33 and ports 34 to passage 71. Water will fill supply line 9 and will also flow through ports 54, tube 52, ports 55, and connection 12 into the bottom of tank 5 to wash upwardly through the mineral in said tank and wash the sediment therein through connection 11, ports 36, tube 33, ports 37, passage 72, ports 56, line 26, and jet chamber 18, out through sewer drain 10.

With unit 23 in its above-described intermediate position, the handle 58 of unit 24 is pulled axially outward to provide a brine circulation through tank 5. The water flow from inlet 8, after passing through ports 54, passes through ports 53 to flow in line 19. Said water also flows through line 25 and through the jet 17 into the sewer drain 10. Flow from the jet induces suction or negative pressure in chamber 18 which is effective, through line 26, ports 56, tube 52, ports 55, and connection 12, to draw water from the bottom of the tank 5 into sewer drain 10. Said tank being enclosed, the vacuum created in the bottom of the tank, induces a brine flow from tank 6, line 13, and past check valve 16 into the top of tank 5. The brine thus circulates downwardly through tank 5 as a simultaneous water supply is added to tank 6 as controlled by float 22.

The salt in the mineral is then washed out by slightly rotating the handle 41 past abutment 79 and further pulling on said handle as limited by the end of slot 78.

The house supply remains on and water will now flow upwardly in connection 11, downwardly through tank 5, upwardly in connection 12, through ports 55 and 56, line 26 and jet chamber 18, through drain 10.

When regeneration of the water softening agent in tank 5 is completed, the handles 41 and 58 are restored to their initial in positions and normal operation is resumed. Since the pistons are all of the same size, the valve is balanced and will retain its set position until manually moved as above indicated.

While I have illustrated and described what I now regard as the preferred embodiment of my invention, the construction is, of course, subject to modifications without departing from the spirit and scope of my invention. I, therefore, do not wish to restrict myself to the particular form of construction illustrated and described, but desire to avail myself of all modifications that may fall within the scope of the appended claims.

Having thus described my invention, what I claim and desire to secure by Letters Patent is:

1. In combination, a water softener tank; a brine tank; a drain line; a first elongated balanced piston valve unit having a water inlet, a house supply outlet, a flow connection to the top of the water softener tank, and a check valve-controlled flow connection from the brine tank to the latter connection; a second elongated balanced-piston valve unit arranged adjacent and parallel to the first valve unit and having a flow connection to the bottom of the water softener tank, a flow connection terminating in a jet nozzle directed into the drain line, a flow connection to the drain line at a point thereof adjacent to said nozzle, and a flow connection to the bottom of the brine tank; flow passage means interconnecting the two valve units; and handle means for moving the pistons of the first valve unit from a first normal position supplying water from the inlet to the house supply outlet that circulates through the water softener tank, to an intermediate position supplying water from the inlet directly to the house supply outlet while water from said inlet simultaneously back-washes through the water softener tank into said drain line.

2. In combination, a water softener tank; a brine tank; a drain line; a first elongated balanced piston valve unit having a water inlet, a house supply outlet, a flow connection to the top of the water softener tank, and a check valve-controlled flow connection from the brine tank to the latter connection, a second elongated balanced-piston valve unit arranged adjacent and parallel to the first valve unit and having a flow connection to the bottom of the water softener tank, a flow connection terminating in a jet nozzle directed into the drain line, a flow connection to the drain line at a point thereof adjacent to said nozzle, and a flow connection to the bottom of the brine tank; flow passage means interconnecting the two valve units; handle means for moving the pistons of the first valve unit from a first normal position supplying water from the inlet to the house supply outlet that circulates through the water softener tank, to an intermediate position supplying water from the inlet directly to the house supply outlet while water from said inlet simultaneously back-washes through the water softener tank into said drain line; and handle means for moving the pistons of the second valve unit from a normal position while the pistons of the first valve unit are in the intermediate position, to a second position for directing water from the inlet to the brine tank and simultaneously to the jet nozzle to induce suction that is effective through the flow connection to the drain line and the flow connection to the bottom of the water softener tank to draw water from the bottom of said tank into and through said drain line and thereby create a vacuum in said water softener tank, said vacuum being effective to draw brine from the brine tank through the check valve-controlled flow connection and the flow connection to the top of the water softener tank into the top of said tank.

3. In combination, a water softener tank; a brine tank; a drain line; a first elongated balanced piston valve unit having a water inlet, a house supply outlet, a flow connection to the top of the water softener tank, and a check valve-controlled flow connection from the brine tank to the latter connection; a second elongated balanced-piston valve unit arranged adjacent and parallel to the first valve unit and having a flow connection to the bottom of the water softener tank, a flow connection terminating in a jet nozzle directed into the drain line, a flow connection to the drain line at a point thereof adjacent to said nozzle, and a flow connection to the bottom of the brine tank; flow passage means interconnecting the two valve units; handle means for moving the pistons of the first valve unit from a first normal position supplying water from the inlet to the house supply outlet that circulates through the water softener tank, to an intermediate position supplying water from the inlet directly to the house supply outlet while water from said inlet simultaneously backwashes through the water softener tank into said drain line; and handle means for moving the pistons of the second valve unit from a normal position while the pistons of the first valve unit are in the intermediate position, to a second position for directing water from the inlet to the brine tank and simultaneously to the jet nozzle to induce suction that is effective through the flow connection to the drain line and the flow connection to the bottom of the water softener tank to draw water from the bottom of said tank into and through said drain line and thereby create a vacuum in said water softener tank, said vacuum being effective to draw brine from the brine tank through the check valve-controlled flow connection and the flow connection to the top of the water softener tank into the top of said tank; the handle means of the first valve unit being adapted, while the pistons of the second valve unit are in the second position, to move the pistons of the first valve unit to a third position maintaining the direct flow from the inlet to the house supply outlet and simultaneously directing water from said inlet through the flow connection from the first valve unit to the top of the water softener tank to wash brine downwardly in the latter tank and outwardly through the flow connection to the bottom of the water softener tank and the drain line.

JOHN EVANS.

REFERENCES CITED

The following references are of record in the file of this patent:

UNITED STATES PATENTS

| Number | Name | Date |
|---|---|---|
| 1,620,717 | Brice et al. | Mar. 15, 1927 |
| 1,759,601 | Apeldorn | May 20, 1930 |
| 1,789,314 | Lindsay | Jan. 20, 1931 |
| 1,889,231 | Wahlbom et al. | Nov. 29, 1932 |
| 2,137,406 | Johnson | Nov. 22, 1938 |